United States Patent [19]

Orii

[11] Patent Number: 5,341,454
[45] Date of Patent: Aug. 23, 1994

[54] DC MOTOR CONTROL IN ELECTRONIC SEWING MACHINE

[75] Inventor: Akira Orii, Hachioji, Japan

[73] Assignee: Janome Sewing Machine Co., Ltd., Tokyo, Japan

[21] Appl. No.: 942,681

[22] Filed: May 19, 1992

Related U.S. Application Data

[63] Continuation-in-part of Ser. No. 538,217, Jun. 14, 1990, abandoned.

[30] Foreign Application Priority Data

Jun. 16, 1989 [JP] Japan .................................. 1-52223

[51] Int. Cl.$^5$ ............................................. H02P 5/168
[52] U.S. Cl. ............................... 388/815; 388/847; 388/903; 388/907.5; 388/930; 388/934
[58] Field of Search ................................ 318/560–636, 318/434; 388/822, 819, 820, 814, 815, 816, 817, 842–847, 902, 903, 907.5, 930, 934, 853–854; 112/121.1, 121.12, 121.29, 103, 275, 272, 274, 277, 445, 447, 453, 454, 455, 457, 458; 364/513

[56] References Cited

U.S. PATENT DOCUMENTS

| | | | |
|---|---|---|---|
| 4,384,241 | 5/1983 | Stillhard | 388/815 X |
| 4,545,314 | 10/1985 | Fujikawa | 112/275 |
| 4,574,226 | 3/1986 | Binder | 318/434 X |
| 4,628,434 | 12/1986 | Tashiro et al. | 364/513 X |
| 4,628,435 | 12/1986 | Tashiro et al. | 364/468 X |
| 4,673,851 | 6/1987 | Disser | 318/599 X |
| 4,691,653 | 9/1987 | Neki et al. | 112/275 |
| 4,692,676 | 9/1987 | Dohi et al. | 318/269 |
| 4,738,211 | 4/1988 | Nakamara et al. | 112/277 |
| 4,749,923 | 6/1988 | Chieng | 318/269 |
| 4,749,927 | 6/1988 | Rodal et al. | 318/599 |
| 4,763,052 | 8/1988 | Lundin et al. | 318/599 |
| 4,879,639 | 11/1989 | Tsukuhara | 318/803 X |
| 4,967,129 | 10/1990 | Tanaka | 318/621 |
| 5,057,757 | 10/1991 | Orii | 318/559 |

Primary Examiner—William M. Shoop, Jr.
Assistant Examiner—David Martin
Attorney, Agent, or Firm—Dann, Dorfman, Herrell and Skillman

[57] ABSTRACT

A load of an electronic sewing machine is self-diagonosed by a control system to cause a DC motor to be operated under control to drive upper and lower shafts of the sewing machine. The control system includes an evaluating device to which a voltage value applied to the DC motor and a rotating speed of the DC motor, both detected, are inputted for determining a current value supplied to the DC motor and a power loss of the DC motor. These data are supplied to a fuzzy inference unit for inferring an optimum rotating speed of the DC motor. A control command signal representing an excessive degree of the actual power loss in reference to the rated power loss is outputted from the fuzzy inference unit to the DC motor for the control of the electric power to be supplied thereto.

2 Claims, 5 Drawing Sheets $V = KN\Phi + RAI$

DC MOTOR CONTROL IN ELECTRONIC SEWING MACHINE

This application is a continuation-in-part of application Ser. No. 538,217 filed Jun. 14, 1990, now abandoned.

BACKGROUND OF THE INVENTION

1. Field of the Invention

This invention relates to an electronic sewing machine provided with an improved control system for controlling a DC motor employed for driving upper and lower shafts of the sewing machine. The control system will automatically detect an overloaded condition in the sewing machine.

2. Description of the Prior Art

It has been recognized necessary that a loaded torque applied to an electronic sewing machine be within a predetermined reference range. An example of the prior art electronic circuits mounted within the sewing machine for self-diagnosis of the overloaded condition is shown in FIG. 7. In this circuit, a volume VR1 of a controller is connected to a power source Vcc whereby a voltage value which is controlled and changed depending upon an operating degree of the controller will be applied via a filter consisting of a resistor R1 and a capacitor C1 to an analog-digital converting terminal A/D1 of a one-tip contral processing unit (hereinlater referred to as IC2). A pulse-width-modulation (PWM) signal which is corresponding to the voltage value thus determined will be outputted from IC2 for the control of a DC motor M which drives the sewing machine. To a reset terminal of IC2 is connected an integrated circuit (IC1) for detecting every rise and fall of the power source Vcc to initialize IC2. The motor M is connected between another power source Vb and a drain of a power MOSFET (FET1). In parallel with the motor M is connected a free wheel diode D1.

The resistor R5 is connected to a source of FET1 for detecting the current value inputted to the motor M. A signal representing a voltage which is in turn corresponding to the current value detected by the resistor R5 is supplied therefrom, via a filter consisting of a resistor R6 and a capacitor C3, to an analog-digital converting terminal A/D3 of IC2. There is provided a diode D2 for preventing an excessive voltage from being inputted to the terminal A/D3. The PWM signal outputted from IC2 is supplied via a gate IC3 and a gate protecting resistor R4 to a gate of FET1.

A sensor 10 is provided for detecting a rotating speed of the motor and supplying a detection signal toward a port P1 of IC2. The sensor 10 may comprise, as known, a disc plate provided with a slit and secured to the sewing machine upper shaft or a main drive shaft and a photo-interrupter device cooperating with the disc to detect every rotation of the shaft, thereby detecting the rotating speed of the motor M.

There are also provided a potential divider consisting of two resistors R2 and R3 for detecting a voltage supplied from the motor drive power source Vb. A divided voltage obtained at a connecting point between these resistors R2 and R3 should be set to a value which does not exceed 5 V, a voltage value supplied from the control power source Vcc, and which is supplied to the terminal A/D2 of IC2. A capacitor C2 serves as a filter for the divided voltage value.

With the prior art system shown in FIG. 7, the current value inputted to the sewing machine motor M can be detected by the resistor R5. However, when a current flow is supplied to the resistor R5 which is connected in series with the motor M, a source potential is increased so that a gate voltage is relatively decreased, thereby making it impossible to drive FET1. To cope with this problem, it has been necessary to provide another power source Va having a voltage value, e.g. 12 V which is substantially higher than 5 V of the control power source Vcc, to be supplied to the gate of FET1. An additional problem that the prior art has incurred is that the current detecting resistor R5 should be of a considerably great degree of capacity. Supposing the resistor R5 will detects a voltage value of about 1 V when the sewing machine is driving with a rated current of the DC motor which is determined to be about 1 A, the resistor R5 will have a resistance of 1$\Omega$. However, under the locked condition of the sewing machine, the resistor R5 would receive an overcurrent of at least 10 A, resulting in heat generation of (10 A)$^2 \times$(1$\Omega$)=100 W or more. In an actual system, there is provided a safe guard means for cutting off the electricity supply to the motor in a while responsive to detection of the locked condition of the sewing machine so that a capacity of the resistor R5 may be decreased to the order to a fraction of 100 W. Even if so, the current detecting resistor R5 has still been required to have a considerable capacity.

Another prior art for detection of the overloaded condition of the sewing machine DC motor will involve substantially constant detection of the rotating speed of the motor. When the rotating speed of the motor should be lowered below a predetermined limit, which should be changed in correspondence with the preset rotating speed which may be selectively determined as desired by operation of the controller, a control means is actuated to automatically interrupt power supply to the motor. For example, after the actual rotating speed S has reached the preset rotating speed S1, it would be lowered as from a time T1 due to a load involved, as shown in FIG. 5. In cases shown by curves A to C, the decreased rotating speed is still higher than a predetermined limit S2, the control operation will not be effected so that the motor continues to rotate under the said loaded condition. In a case shown by a curve D, however, the actual rotating speed S is decreased below the limit S2, in which case the motor will be prevented from further power supply. Once the power supply to the motor is interrupted, it will be necessary to again operate the controller or depress a start button for redriving the motor.

In accordance with the prior art discussed above, there would be a risk of the motor and a motor drive circuit connected thereto being overheated by repeated drive/stop operation, which may result in machine troubles. In some case, a machine component would be destroyed by fire. Moreover, the overloaded condition shown by the curves A to C in FIG. 5, for example, could not be detected by the control system of this prior art. If the motor is driving under such an overloaded condition for a long period of time, there would be a cause of various machine troubles, as well.

It could be considered that a temperature sensor be arranged for detecting a temperature rise of the sewing machine motor during continuous driving thereof. In practice, the temperature sensor could not be mounted within the motor but is attached to the outer periphery.

However, as clearly demonstrated by the graph in FIG. 6, the temperature sensor attached to the outside of the motor could not detect an actual temperature rise occurring inside the motor.

SUMMARY OF THE INVENTION

It is therefore an object of this invention to provide an improved DC motor control system capable of detecting an overloaded condition of a DC motor employed in an electronic sewing machine, with the disadvantages and defects of the prior art system being eliminated.

According to an aspect of this invention there is provided a control system for controlling a DC motor employed in an electronic sewing machine for driving upper and lower shafts, which comprises means operated to drive the DC motor at a desired rotation speed; means for feeding back a rotation speed of the DC motor; means for feeding back a voltage value applied to the DC motor; means for calculating a current value from the rotation speed of the DC motor and the voltage value applied to the DC motor; means for calculating a power loss incurred in the DC motor from the current value; and fuzzy inferring means storing predetermined fuzzy rules so formulated as to evaluate a power loss difference between the power loss and a rated power loss of the DC motor based on the current value and the power loss and further to evaluate deceleration of a rotation speed of the DC motor based on the current value and a time-cumulative value of the evaluation power loss differences so that a voltage to be applied to the DC motor is controlled to a lower value so that the DC motor is running at the decelerated rotation speed.

This invention has been provided by practical application of the known fuzzy theory which was proposed originally by Lotfi A. Zadeh, Professor of California Univ. in 1964 for dealing with a set of ambiguous conceptions or "fuzzy set". Fuzzy set is defined by a specific "membership function" to lead out a "membership value" ranging between 0 and 1.

BRIEF DESCRIPTION OF THE DRAWINGS

Further objects and advantages of this invention can be fully understood from the following detailed description when read in conjunction with the accompanying drawings in which.

DETAILED DESCRIPTION OF THE EMBODIMENT

Figure 1:
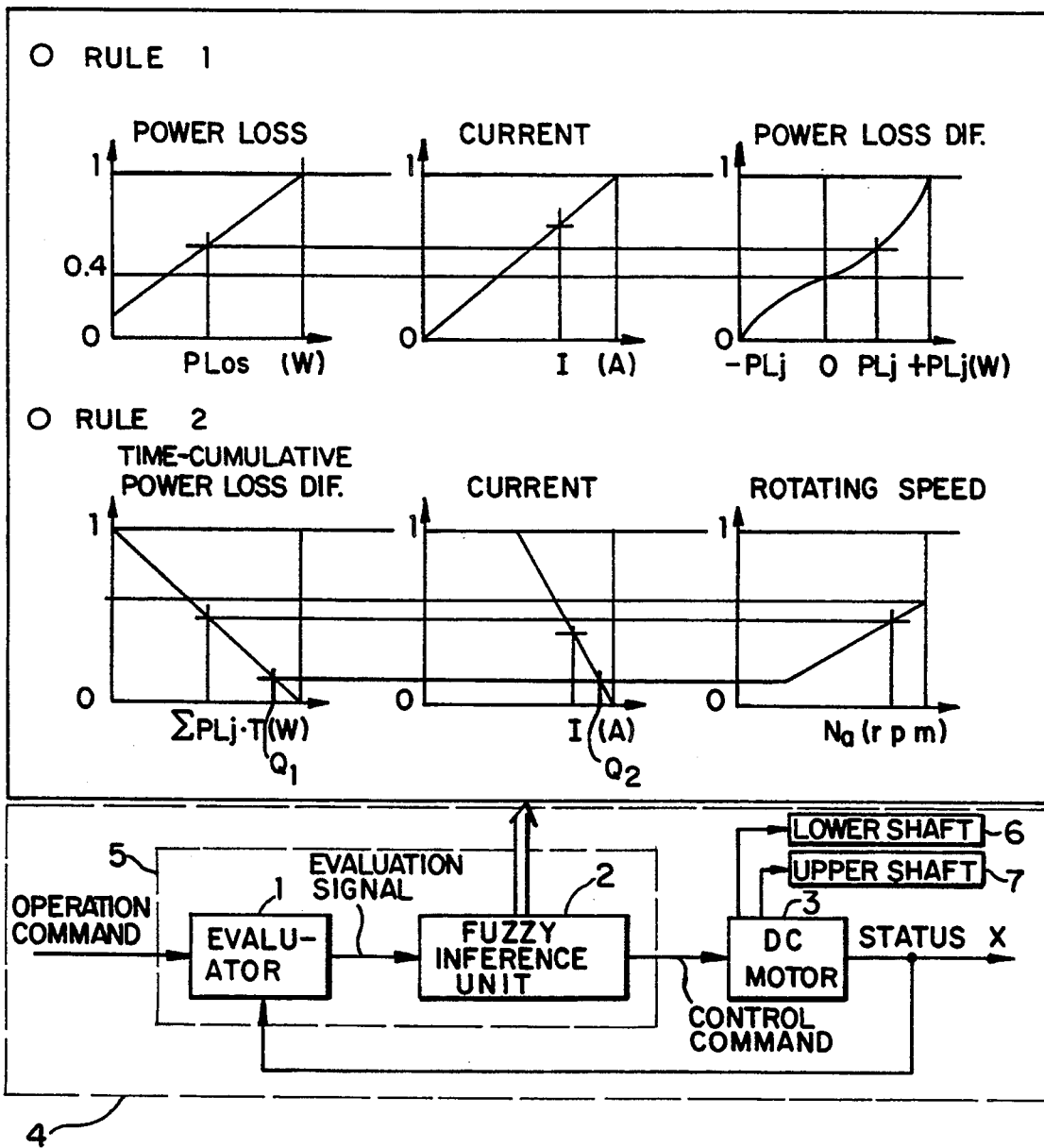
FIG. 1 is a block diagram showing a DC motor control system embodying the invention.

Specifically referring to FIG. 1, a DC motor control system in an electronic sewing machine 4 includes an evaluator 1 which become operable responsive to an operation command signal and is adapted to receive a status data signal representing a status X of an object 3 to be controlled. In this instance, the control object 3 is a DC motor employed for the sewing machine and the status X comprises a voltage applied to the DC motor and a rotating speed thereof, which are respectively detected by corresponding detection devices such as a voltmeter for the former and a photo-sensor device (which may be of a type described in connection with the sensor 10 in FIG. 7) for the latter. With these data, the evaluator 1 will be operated to determine a momentary power loss [PLos] of the DC motor and a momentary current value [I] flowing through the DC motor, which are included in an evaluation signal to be outputted therefrom to a fuzzy inference unit 2.

The DC motor 3 rotates a lower shaft 6 and a upper shaft 7 in the sewing machine 4 in a timed relation, for stitching operation.

Function of the evaluator 1 and the fuzzy inference unit 2 are accomplished in a control unit 5.

The fuzzy inference unit 2 is operated in response to the evaluation signal to surmise a power loss difference [PLj] between a rated loss and an actual power loss, in accordance with a first prescribed fuzzy rule. The fuzzy inference unit 2 is then operated in response to a time-cumulative power loss difference [$\Sigma$PLj·T] determined by the power loss difference [PLj] which has been obtained and the momentary current [I] included in the evaluation signal, to surmise a rotating speed [Na] of the DC motor 3 to be reset, in accordance with a second prescribed fuzzy rule. The surmised result is outputted from the unit 2 as a control command signal, by which a power to be supplied to the DC motor 3 is controlled.

The first and second fuzzy rules to be applied in operation of the fuzzy inference unit 2 are graphed also in FIG. 1, which will now be described in detail.

In Rule 2, the actual power loss [PLos] (in unit of W) in the DC motor 3 which is calculated by the evaluator 1 and included in the evaluation signal outputted therefrom toward the unit 2 is plotted on the abscissa of a first membership function, according to which a first membership value ranging between 0 and 1 may be obtained on the ordinate. The actual current value [I] (in unit of A) flowing through the DC motor which is also calculated by the evaluator 1 and included in the evaluation signal is plotted on the abscissa of a second membership function to lead out a second membership value in a range from 0 to 1 on the ordinate. In accordance with a lower one of the membership values thus obtained, a third membership function is applied for determining the power loss difference [PLj] (in unit of W) between the actual power loss [PLos] and the rated loss. If the power loss [PLos] of the DC motor exceeds the rated loss, the difference [PLj] has a positive value. In the example shown in FIG. 1, regarding Rule 1, the power loss difference [PLj] will be zero when the lower one of the first and second membership values, which is to be applied to the ordinate of the third membership function, is 0.4.

Next, in Rule 2, the time-cumulative power loss difference [$\Sigma$PLj·T] (in unit of W), which will be determined based on the power loss difference [PLj] determined by application of Rule 1, and the actual and momentary current value [I] (in unit of A) included in the evaluation signal outputted from the evaluator 1 are plotted on the abscissa of first and second membership functions to lead out first and second membership values on the ordinates thereof, respectively. A greater one of the first and second membership values thus obtained is plotted on the ordinate of a third membership function to determine the optimum rotating speed [Na] (in unit of r.p.m.) on the abscissa.

In application of Rule 1, the time-cumulative power loss difference [ΣPLj·T] is related with the momentary current value [I] to infer the optimum rotating speed [Na] of the DC motor. In general, the current value [I] flowing through the DC motor changes with the load condition of the sewing machine. However, during the sewing machine operation, there is a great fluctuation of load applied to the sewing machine, depending upon the thickness of fabric being sewn, for example. Even if the time-cumulative power loss difference [ΣPLj·T] increases to a certain level, it is not necessary nor advantage to decelarate or stop the DC motor if the current value [I] at this moment maintains a sufficiently lower one.

Figure 3:
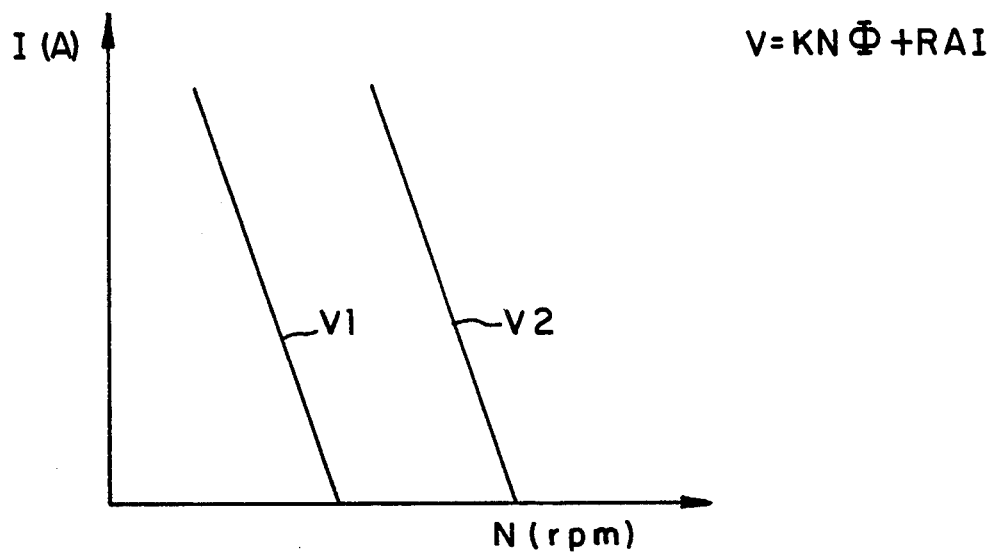
FIG. 3 is a graph showing characteristics of a DC motor to be controlled in the system.

Here, the characteristics of the DC motor will be explained in reference to FIG. 3. A voltage value applied to the DC motor may be obtained from the following equation (1):

$$V = K \cdot N \cdot \phi + RA \cdot I \qquad (1)$$

where [V] represents a voltage, [K] a constant, [N] a rotating speed, [RA] a resistance of an armature, [I] a current and [φ] a magnetic flux.

Since the magnetic flux [Φ] of the DC motor is substantially constant and the armature resistance [RA] would not be changed greatly as far as in the same series of the DC motors, variables in the equation (1) will consist of the actual rotating speed [N] of the DC motor, which is dependent upon the sewing machine load, and the current [I]. From the equation (1) can be led out the following equation (2) which means that the current [I] can be determined substantially in dependence upon the motor rotating speed [N] and the applied voltage [V]:

$$I = (V - K \cdot N \cdot \Phi)/RA \qquad (2).$$

Meanwhile, the power loss [PLos] can be determined by the following equation (3):

$$PLos = I^2 \cdot RA + W1 \qquad (3)$$

where [W1] represents an inherent power loss of the motor which can be regarded as a constant and which can be determined from the following equation (4):

$$W1 = D \cdot N + W \qquad (4)$$

where [D] represents a coefficient and [W] a power loss which would not be varied with the motor rotating speed [N].

From the equations (2) and (3), the evaluator 1 will determine the current [I] and the power loss [PLos] to output the evaluation signal toward the fuzzy inference unit 2, with the actual motor rotating speed [N] and the applied voltage [V] having been detected. These values will be used in application of the respective fuzzy rules, Rule 1 and Rule 2, to determine the first and second membership values.

Referring again to FIG. 1, Rule 1 has been prepared to infer the difference [PLj] between the rated loss and the actual loss in the DC motor, from the inputted parameters on the abscissa of the first and second membership functions, which comprise the power loss [PLos] and the current [I]. In general, however, the power loss difference [PLj] could theoretically be obtained by subtracting the rated loss from the power loss [PLos] determinable by the above equation (3). The reason why Rule 1 has nevertheless been provided in the present invention will be as follows:

Although the armature resistance [RA], the magnetic flux [Φ] and the inherent power loss [W1] have been known as constants, these are so-called average values and therefore would be varied depending upon manufacturing errors in the same kind of the DC motor, even though remaining in a permissible range, as well as operating condition of the DC motor. In the present invention, therefore, these values obtained by calculation are regarded as ambiguous values. In view of experiential rules and by repeated experiment, there could have been provided the first membership function with the power loss [PLos] being inputted as a parameter to be plotted on the abscissa thereof to lead out a first membership value, the second membership function with the current [I] being inputted as a parameters to be plotted on the abscissa thereof to lead out a second membership value and the third membership function for inferring the power loss difference [PLj] from one of the first and second membership values. The power loss difference [PLj] fuzzy-inferred in such a manner will be of a value much more accurate and reliable rather than that obtained by mere application of the above function (3). The first to third membership functions in Rule 2 regarding the time-cumulative power loss difference [ΘPLj·T], the current [I] and the optimum rotating speed [Na] have also been prepared by experiential rules and repeated experiments for obtaining a favorable result regarding the optimum rotating speed [Na] lying on the abscissa of the third membership function.

Figure 2:
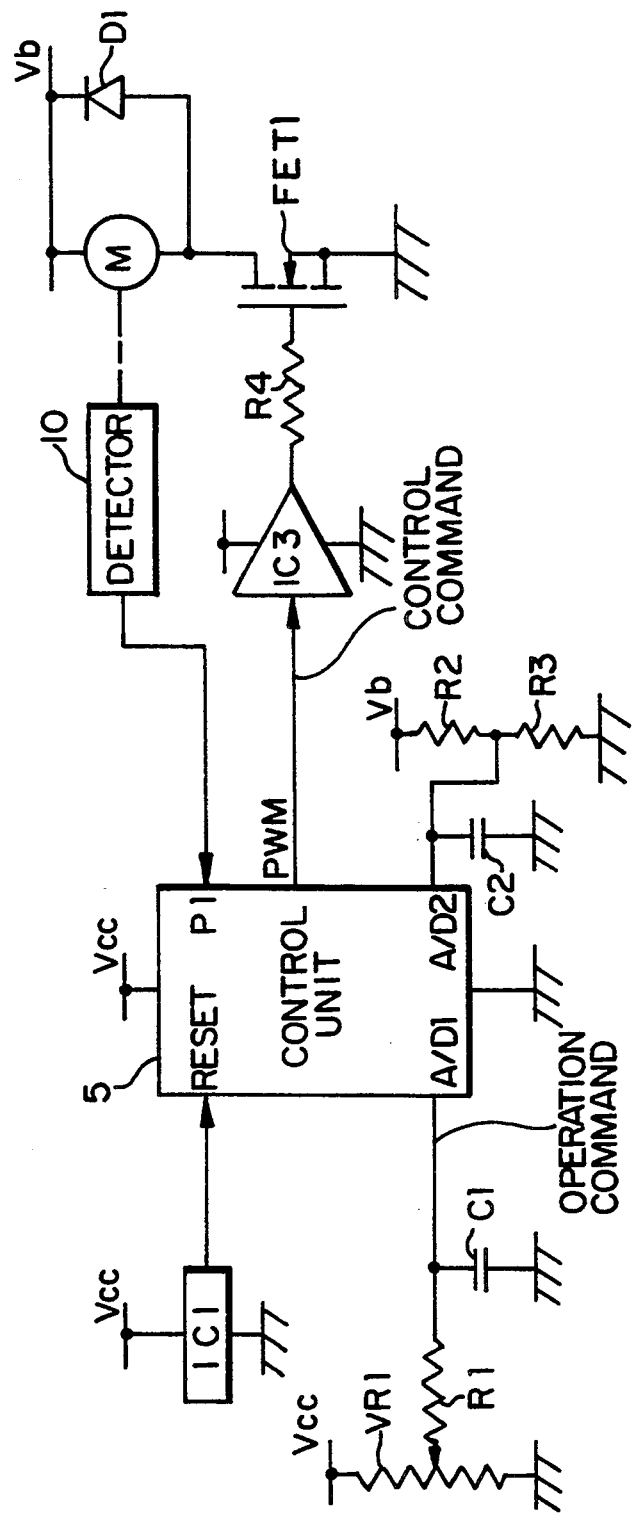
FIG. 2 is a block diagram showing a circuit arrangement employed for the control system.
Figure 7:
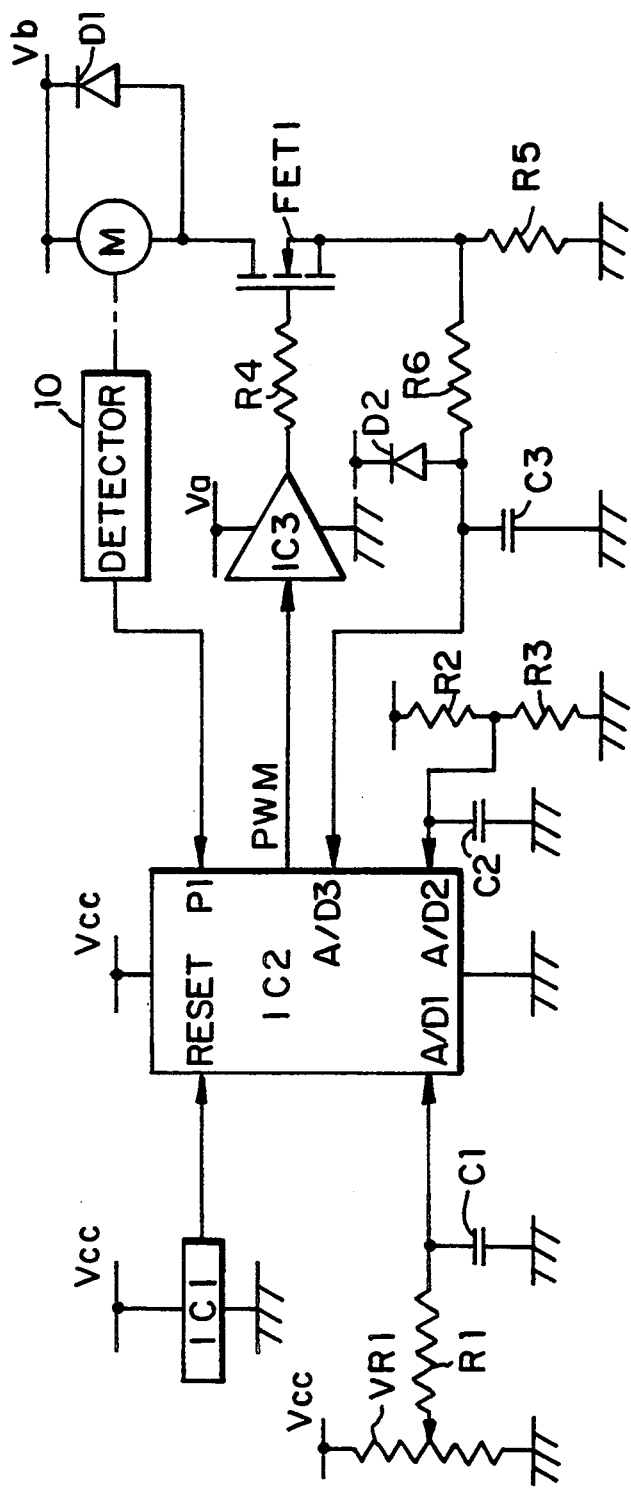
FIG. 7 is a block diagram showing a circuit arrangement of another prior art control system.

An electric circuit used for the system is shown in FIG. 2 in which the elements and components identical to those used in the prior art circuit shown in FIG. 7 are accompanied by the same references and detailed explanation thereof is omitted for simplicity. As known from comparison between these two circuits in FIGS. 2 and 7, there is no need for the circuit according to the invention to provide the resistor R5 of low resistance and high capacity (in FIG. 7) which has been required for detecting the current flowing into the DC motor M. The filtering resistor R6 and capacitor C3 and the input protecting diode D2 can also be omitted from the prior art circuit. Moreover, since the resistor R5 is not connected in series with the motor M in the present circuit, the power MOS-FET (FET 1) can be driven with a considerably lower voltage and therefore by the control power source Vcc of 5 V, for example. There is no need to provide a separate power source such as Va of 12 V (FIG. 7) for driving the FET 1. Such differences will improve space availability in the sewing machine and reduce manufacturing costs to a great extent.

The control unit 5 has the expanded function as compared with IC2 in the prior art circuit shown in FIG. 7. More particularly, the control unit 5 functions as the evaluator 1 (FIG. 1) to calculate the current value [I] from the rotating speed of the DC motor 3 and the voltage value applied to the DC motor 3, as well as to calculate the power loss [PLos] incurred in the DC motor 3 from the current value [I]. The rotating speed of the DC motor 3 is detected by the detector 10 and data thereof is inputted to the port P1 of the control unit 5. A digital value representing the voltage value applied to the DC motor 3 is inputted to the terminal A/D1 of the control unit 5.

The control unit 5 also functions as the fuzzy inference unit 2 (FIG. 1) storing the predetermined Rules 1 and 2, which are applied each time when receiving the evaluation signal from the evaluator 1, to infer at last the optimum rotating speed [Na] of the DC motor 3 to be regulated by the control system.

Figure 4:
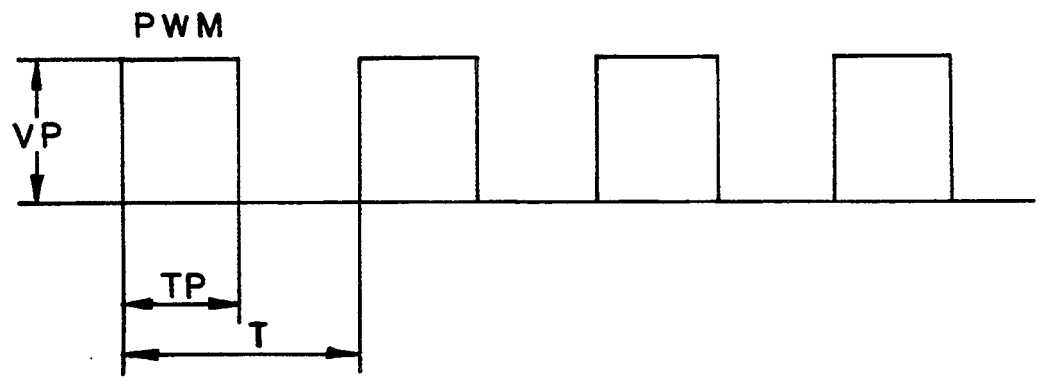
FIG. 4 is an explanatory view showing a manner in which an applied voltage is determined in a PWM control.
Figure 5:
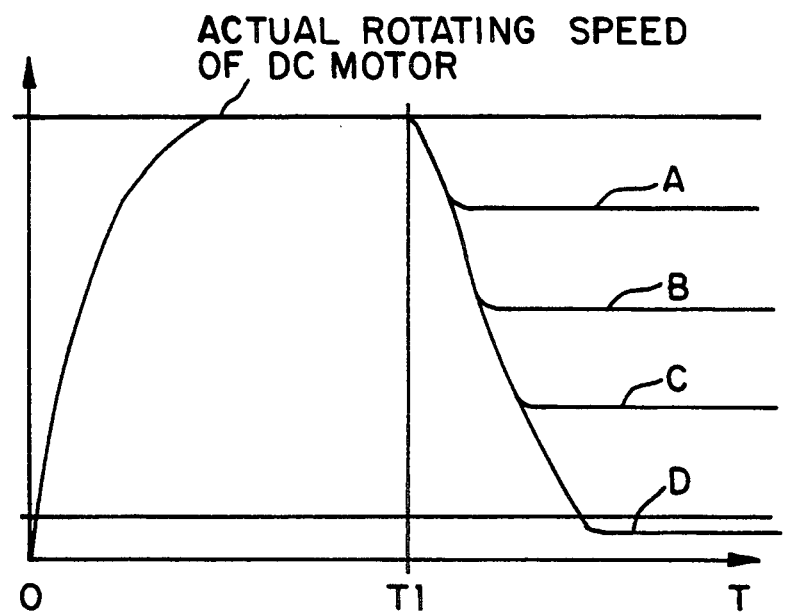
FIG. 5 is a graph showing a manner of control operation of a prior art control system.
Figure 6:
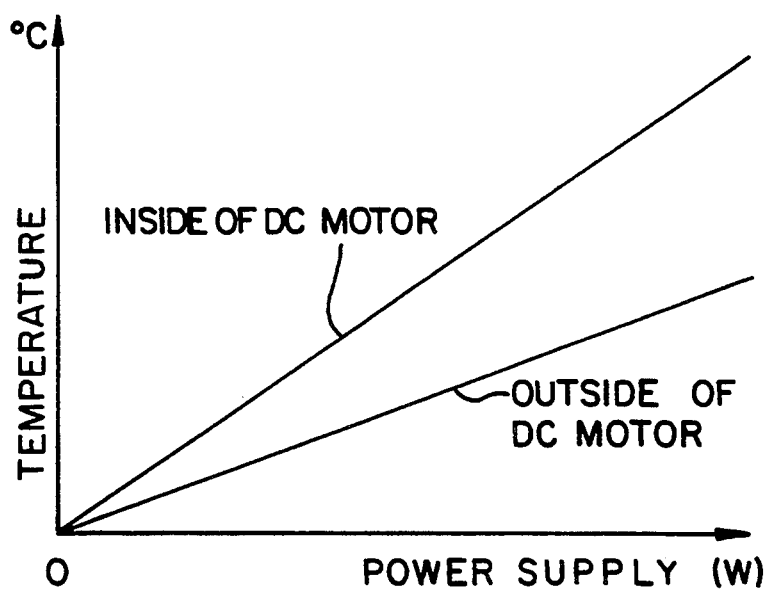
FIG. 6 is a graph showing a difference between temperature rises inside and outside of the motor.

When actuating the controller VR1 to set a certain voltage level, a corresponding level signal is inputted to the first analog-digital converting terminal A/D1 of the control unit 5 which will then output a PWM signal for setting a rotating speed of the motor to be dependent upon the level signal. To the second analog-digital converting terminal A/D2 of the control unit 5 is inputted a voltage value divided between the resistors R2 and R3, which is converted into a corresponding digital value [VP] with a necessary data correction. In further reference to FIG. 4, this digital value [VP] is utilized to determine the applied voltage [V] in accordance with the following equation (5):

$$V = VP \times TP/T \qquad (5)$$

where [TP] represents a pulse width and [T] a maximum pulse width, both being defined by time.

The actual rotating speed [N] of the DC motor is detected by the sensor 10 and then supplied to the input terminal P1 of the control unit 5. As having been described, the applied voltage [V] and the motor rotating speed [N] constitute the state X of the DC motor, which is processed in the evaluator 1 to determined the current [I] and the power loss [PLos] of the DC motor in accordance with the aforementioned equations (2) and (3) respectively. It should be noted that there is no need to directly measure the current [I] in the present control system, which makes it unnecessary to provide the resistor R5.

In accordance with the optimum rotating speed [Na] of the DC motor which has been inferred by application of Rules 1 and 2, the control unit 5 will be operated to output the control signal to thereby controlling the voltage to be given to the DC motor. It can be seen from Rule 2 in FIG. 1 that when the time-cumulative power loss difference [ΣPLj·T] exceeds a predetermined upper limit Q1, and the momentary current value [I] also exceeds a predetermined upper limit Q2, the inferred rotating speed [Na] of the DC motor should be substantially zero and therefore come to a stop.

Although the invention has been described in conjunction with a specific embodiment thereof, it is to be understood that many variations and modifications may be made without departing from spirit and scope of the invention as defined in the appended claims.

What is claimed is:

1. In an electronic sewing machine having upper and lower shafts to be rotated by a DC motor, a DC motor control system comprising:
    means (VR1) operated to drive the DC motor at a desired rotation speed;
    means (10) for feeding back a rotation speed of the DC motor;
    means (R2, R3, C2) for feeding back a voltage value applied to the DC motor;
    means for calculating a current value (I) from the rotation speed of the DC motor and the voltage value applied to the DC motor;
    means for calculating a power loss (PLos) incurred in the DC motor from the current value (I); and
    fuzzy inferring means storing predetermined fuzzy rules so formulated as to evaluate a power loss difference (PLj) between the power loss (PLos) and a rated power loss of the DC motor based on the current value (I) and the power loss (PLos) and further to evaluate deceleration of rotation speed of the DC motor based on the current value (I) and a time-cumulative value (ΣPLj·T) of the evaluated power loss difference (PLj), so that a voltage to be applied to the DC motor is controlled to a lower value so that the DC motor is running at the decelerated rotation speed.

2. DC motor control system according to claim 1 which further comprises means for interruptting energization of the sewing machine when the time-cumulative power loss difference [ΣPLj·T] exceeds a predetermined upper limit.

* * * * *